US005185192A

United States Patent [19]

Banus

[11] Patent Number: 5,185,192

[45] Date of Patent: Feb. 9, 1993

[54] ORNAMENTAL PRE-CAST TERRAZZO PANELS WITH INTEGRAL INLAY DESIGN

[75] Inventor: Christopher T. Banus, Fairfield, Iowa

[73] Assignee: The Granitech Corporation, Fairfield, Iowa

[21] Appl. No.: 756,964

[22] Filed: Sep. 9, 1991

Related U.S. Application Data

[62] Division of Ser. No. 345,480, May 5, 1989, Pat. No. 5,047,187.

[51] Int. Cl.[5] ........................ B28B 1/08; B29C 39/12; B32B 3/14; B44C 3/10

[52] U.S. Cl. ........................ 428/49; 156/63; 264/71; 264/154; 264/247; 264/254; 264/256; 264/504; 264/570

[58] Field of Search ........................ 428/47–49; 264/69, 71, 72, 138, 139, 154, 155, 156, 162, 245–247, 233, 254, 256, 504, 500, 112, 109, 570

[56] References Cited

U.S. PATENT DOCUMENTS

| | | | |
|---|---|---|---|
| 667,898 | 2/1901 | Wilcke | 156/631 |
| 704,621 | 7/1902 | Czermak | 428/15 |
| 1,137,595 | 4/1911 | Eyl | 264/71 X |
| 1,155,140 | 9/1915 | Filer . | |
| 1,304,083 | 5/1919 | Moore . | |
| 1,666,232 | 4/1928 | Boynton | 428/49 X |
| 1,728,397 | 9/1929 | Dearden | 428/48 X |
| 1,924,787 | 8/1933 | Hill | 428/15 X |
| 1,947,459 | 2/1934 | Casto . | |
| 2,274,907 | 3/1942 | Madala | 428/49 X |
| 2,835,996 | 5/1958 | De Paoli, Sr. . | |
| 3,247,299 | 4/1966 | Zaha | 428/49 X |
| 3,463,653 | 8/1969 | Letter . | |
| 3,492,391 | 1/1970 | Van Atten . | |
| 4,254,077 | 3/1981 | Fontana et al. . | |
| 4,486,371 | 12/1984 | Caliri . | |
| 4,814,035 | 3/1989 | Turner | 428/187 X |
| 4,842,921 | 6/1989 | Sorko-Ram | 428/187 |
| 4,939,010 | 7/1990 | Goossens | 428/49 |
| 5,047,187 | 9/1991 | Banus | 264/256 X |

*Primary Examiner*—Karen Aftergut

*Attorney, Agent, or Firm*—Senniger, Powers, Leavitt & Roedel

[57] ABSTRACT

A pre-cast terrazzo panel having detailed, multicolor designs therein constituted by background and inlay designs of different colors includes inlay and background colors which are integral with no surface difference between the inlay and the background. The process for preparing the panel involves the steps of (a) providing a pre-cast unpolished terrazzo panel with a first background color; (b) cutting out an inlay pattern or design in the terrazzo panel to create a silhouette cut-out panel; (c) placing the cut-out panel in a mold, pouring a blend of a second color including a binder and aggregate into the cut-out and curing the blend to create a cured inlay of a second color in the panel; (d) repeating steps (b) and (c) as often as desired with blends having colors the same or different from the first and second colors; and (e) polishing the resulting panel to produce a terrazzo panel having a plurality of colors therein with each inlay color being integral with the background color and without the different colors being separated from each other by divider strips.

3 Claims, 2 Drawing Sheets

ORNAMENTAL PRE-CAST TERRAZZO PANELS WITH INTEGRAL INLAY DESIGN

This application is a divisional application of application Ser. No. 345,480, filed on May 5, 1989, now U.S. Pat. No. 5,047,187, issued Sep. 10, 1991.

BACKGROUND OF THE INVENTION

The Present invention relates to ornamental terrazzo panels and, more particularly, to novel terrazzo panels having detailed, multicolor inlay logos or designs therein and wherein the inlay piece of one color and panel of a different background color are integral with no surface difference between the inlay piece and background color and without the different colors being separated from each other by border strips.

Terrazzo is an ancient and well-known product widely used in floors and the like to produce pleasing and ornamental effects. Terrazzo may be made in precast slabs or panels or it may be poured in place, and is generally prepared from a blend consisting of a binder such as cement or a synthetic resin (e.g. polyester or epoxy) and an aggregate such as marble, glass, granite or other natural or synthetic mineral material.

Pre-cast terrazzo panels are typically made by blending a binder such as polyester with an aggregate such as marble chips, pouring the blend into a pan or mold or the like and vibrating to eliminate the air from the blend. The terrazzo blend is then cured at room temperature or at an elevated temperature and the raw pre-cast terrazzo panel is removed from the mold and polished.

Heretofore, it has been the practice in creating terrazzo designs, as for example in the lobby floors of commercial buildings, to utilize brass, zinc or plastic border or divider strips to separate the different colors of terrazzo, one from another, thereby creating different spaces into which the terrazzo blends of different colors may be poured and cured in place. The result is a terrazzo design in which individual pieces of terrazzo of different colors or designs are separated from each other by divider strips so that a unitary appearance of an integral, multicolor design is not achieved. However, such a procedure does not lend itself to use with precast terrazzo panels.

There is a need, therefore, for an improved process for producing ornamental pre-cast terrazzo panels for use in floors, walls, countertops or furniture with the panels having detailed, multicolor inlay logos or designs therein and wherein the inlay piece and background are of different colors but integral with each other for improved appearance.

SUMMARY OF THE INVENTION

Among the objects of the present invention may be noted the provision of an improved process for preparing a pre-cast terrazzo panel having detailed, multicolor inlay logos or designs therein; the provision of such a process which enables one to create attractive multicolor terrazzo designs without the necessity for using divider or border strips; the provision of a process of the type described which may be used to produce a pre-cast terrazzo panel having as many different colors therein as are desired for different designs; and the provision of such a process which is economical and convenient to practice. Other objects and features of the invention will be in part apparent and in part pointed out hereinafter.

Briefly, the present invention is directed to a process for preparing a pre-cast terrazzo panel having detailed, multicolor designs therein constituted by background and inlay designs of different colors and wherein the inlay and background colors are integral with no surface difference between the inlay and background comprising the steps:

(a) providing a pre-cast, unpolished terrazzo panel with a first background color;
(b) cutting out an inlay pattern or design in the terrazzo panel to create a silhouette cut-out panel;
(c) placing the cut-out panel in a mold, pouring a blend of a second terrazzo color into the cut-out and curing the blend to create a cured inlay of a second color in the panel;
(d) repeating steps (b) and (c) as often as desired with blends having colors the same or different from the first and second colors; and
(e) polishing the resulting panel to produce a terrazzo panel having a plurality of colors therein with each inlay color being integral with the background color and without the different colors being separated from each other by divider strips.

The invention is also directed to novel pre-cast terrazzo panels having detailed, multicolor designs therein produced by such a process in which inlays are formed in situ.

DESCRIPTION OF THE PREFERRED EMBODIMENTS

Figure 1:
FIG. 1 is a plan view of an unpolished pre-cast terrazzo panel of one color.

In accordance with the present invention, it has been found that pre-cast terrazzo panels having detailed, multicolor designs therein may be prepared through the novel process described herein. This process provides such multicolor design terrazzo panels characterized by extremely fine detail on points, curves or straight lines of the inlay designs, multiple inlay colors and with no need for terrazzo type divider strips such as are presently used to achieve multicolor terrazzo designs. Moreover, through the process of the present invention, integrated multicolor terrazzo designs can be achieved wherein one inlay color crosses another inlay color with no seams or joints discernible to the eye or touch and with no surface difference between the inlay pieces and background color. Thus, the process of this invention renders it possible to produce truly integral multicolor terrazzo designs which are more attractive than those produced by conventional techniques.

Terrazzo is, in general, a decorative surface made by blending stone chips or other aggregates with a binder; forming the mass into a mold or onto a surface; allowing said mass to harden; and then grinding or polishing to create a smooth decorative surface.

Until 1950, virtually all terrazzo was made with cement as the binder and marble chips as the aggregate. In the last 40 years, the availability of synthetic thermosetting resin binders and other natural and synthetic aggregates have expanded the range of binder/aggregate combinations resulting in a proliferation of appearances of terrazzo and terrazzo-like composite materials. Conventional terrazzo looks are now made from marble chips and cement, epoxy, acrylic, polyester, urethane, nylon, or other resinous binders, with aggregate sizes from 1″ or larger down to 1/16″ or smaller. Aggregates now include marbles, sand, glass, plastic chips, pulverized minerals, etc. As the aggregate particle size has become smaller, the traditional speckled appearance of marble chips in a background of binder has been supplemented by terrazzos and terrazzo-like composites where the visual distinction (from normal viewing distance) between aggregate and binder disappears. For example, in industrial terrazzo made from resin binders and fine sands, the surface appearance is completely homogeneous. Similarly, in other terrazzo-like composites of resins and finely powdered mineral fillers, the visual appearance is more of solid plastic than of an obvious composite nature. Such terrazzo-like materials have found wide acceptance in countertop applications.

The percent by volume of the aggregates used ranges from under 30% to over 90%, depending on the appearance desired. In a few cases of precast terrazzos utilizing very fine aggregates, there is no need to polish the surface as the especially smooth surface of the mold leaves a satisfactorily smooth and attractive finish.

With the availability since 1950 of stronger resin binders making possible thin, lightweight and strong composite materials, more and more terrazzos are being precast in factories and shipped to the installation site as tile or counter slabs. Previously, nearly all terrazzo was poured in place.

As used herein, the term "terrazzo" includes the terrazzo and terrazzo-like composite materials mentioned above or made by any of the above-described methods or processes.

The process of the present invention is initiated with the provision of an unpolished pre-cast or prefabricated terrazzo panel of any desired size. A pre-cast or prefabricated terrazzo panel is defined as any panel (tile) which is made of a blend of a binder and aggregate as the term blend is encompassed within the above-defined term "terrazzo" whether the panel is formed by the traditional terrazzo method of pouring the uncured blend into a shallow mold to form a sheet or panel that is one tile thick or by the newer block method of pouring the uncured blend into a deep mold to form a block that is then cut into a plurality of sheets or panels of desired size.

The binder component of the blends employed may be a thermosetting resin such as an epoxy, polyester, urethane, acrylic, nylon or other resin or it may be cement, or a resin modified cement. As cement and resin modified cements are not as strong as epoxy and polyester resins, the resultant tile/ panel must usually be ½″ to ¾″ thick. The blends also include at least 70% by weight aggregate which may be marble, granite, sand, quartz, plastic chips, pulverized minerals, glass or other natural or synthetic mineral in sizes from 1″ down to fine powders. Color is sometimes imparted to the blend by pigmenting the binder or resin component with a pigment of the desired color.

A typical formulation or blend for producing a sheet tile or panel that is one tile thick (approximately 27 sq. ft. ×⅜″ thick) by the traditional terrazzo method contains 25 lbs of resin/binder, 25 lbs. of fine aggregate and 90 lbs. of coarse aggregate. The resin/binder is blended and catalyzed, followed first by the addition of the fine aggregate and then the coarse aggregate. The resulting blend is poured into a pan, and troweled and/or vibrated into place. The blend is then cured to produce a panel which is then ground or polished and sealed.

A typical formulation or blend for producing a block of desired dimensions (e.g. 48″×48″×8″) by the block method contains 250 lbs. of resin/binder, 625 lbs. of fine aggregate, and 1000 lbs. of coarse aggregate. The binder and aggregates are blended and then poured into a block mold. Vibration and/or vacuum is used to remove air bubbles. The block is then cured and then sawn or cut into sheets of desired dimensions (e.g. 48″×48″×⅜″) that are ground or polished.

Figure 2:
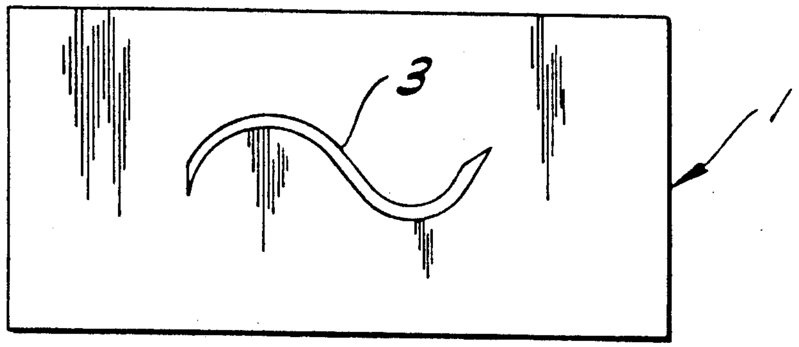
FIG. 2 is a plan view of the panel of FIG. 1 with a first inlay design cut out therein.

An unpolished pre-cast terrazzo panel designated 1 produced by one of the above methods is shown in FIG. 1 as the starting material for the process of the invention. As indicated, such a panel may be produced in various desired dimensions and may be, for example, 1/16″ to 1″ or more thick. A first inlay pattern or design 3 is cut out in panel 1, through the complete thickness of panel 1, to create a silhouette cut-out panel. This first inlay design may be cut out by various cutting techniques such as water jet, laser, jig saw, router, hand tools or other means provided the cutting tool or means is capable of beginning its cut in the interior of panel 1 and is capable of cutting the terrazzo panel with sufficient precision and detail consistent with the design desired. The design 3 shown in FIG. 2 viewed from the forming face of the panel, is a curved design and is illustrative of designs which may be cut out of terrazzo panels without undue difficulty. In order to facilitate registration of the panel 1 for subsequent cut out steps or for final cutting or trimming of inlaid pieces, registration marks or holes (not shown) should be cut in the panel (in an area to be trimmed off in the final cutting or trimming) during the first cut-out cycle or operation. The registration marks or holes can be used to ensure that the same alignment of the panel with respect to the cutting mechanism exists for subsequent cutting operations as existed for the initial cutting operation. This is particularly desirable when utilizing high precision computer aided cutting equipment.

The panel 1 with the inlay pattern or design 3 is placed in a flat mold which has been prepared with a mold release agent or compound appropriate to the type of binder used for the inlay terrazzo material. It is necessary that the panel 1 be held in the mold to prevent vertical or lateral movement of panel 1 with the silhouette design cut-out 3 during the inlay terrazzo material pouring procedure. The pouring procedure usually requires that the mold and silhouette cut-out 3 in panel 1 be vibrated with considerable force in order to settle and release air from the terrazzo inlay material poured into the silhouette design cut-out 3. The amount of vibration needed to settle the aggregate in the terrazzo blend and to release entrapped air increases substantially as the size of the pieces of aggregate in the terrazzo blend approach ½ to ¾ the size of the smallest cut-out cross section to be filled or as the concentration of the aggregate in the terrazzo blend becomes greater. Thus, by fixing the panel 1 with silhouette design cut-out 3 in the mold, the terrazzo blend being poured into the cut-out is fully flush with, and settled against, the mold which defines the face of the inlay and is prevented from working its way between the mold and the finished face of the panel and thereby reducing the effectiveness of the process or detracting from the quality of the finished appearance. To avoid these consequences, the mold is preferably treated with a mold release agent and then coated with a solvent- diluted high viscosity resin that is compatible with the binder/resin utilized in the terrazzo blend inlay material. The agent or compound used should be compatible with the inlay material binder because the inlay material occupies the entire thickness of the panel in the area from which the cut-out design was removed and therefore the inlay material contacts the mold surface. The solvent is allowed to evaporate and leave a thin gummy film of resin into which the panel is laid effectively adhering it to the mold. This film of resin is selected to cure to a hard mold-releasable surface at the same time the freshly inlaid terrazzo blend material cures. Mechanical clamps around the edges of the mold prevent lateral movement.

Figure 3:
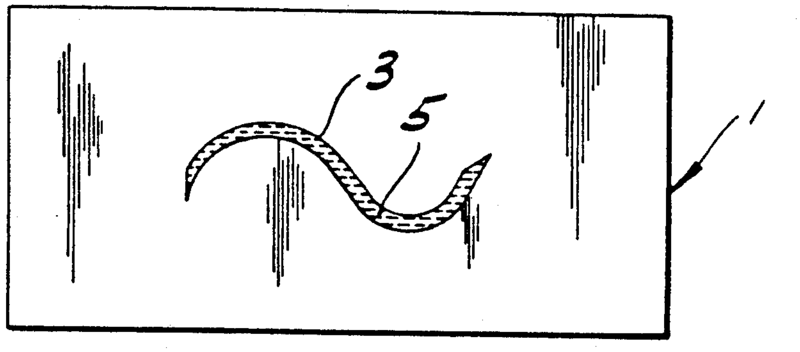
FIG. 3 is a plan view of the panel of FIG. 2 with the first inlay cut out filled with a cured terrazzo blend of a second color.

After the panel 1 with silhouette design cut-out 3 is fixed in or adhered to the mold, a blend of a suitable binder and aggregate of a color different from the background color of panel 1 is poured into the cut-out 3 with the panel/mold assembly being vibrated as described. The poured blend is allowed to cure with sufficient heat and for a sufficient time to produce a panel having a cured inlay of a second color 5 in cut-out 3 co-planar with, and forming part of, the face of the panel as shown in FIG. 3. The resulting panel is then removed from the mold.

Figure 4:
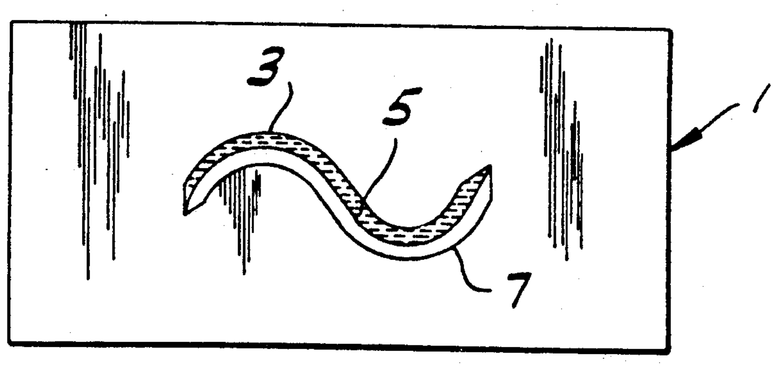
FIG. 4 is a plan view of the panel of FIG. 3 with a second inlay design cut out therein.
Figure 5:
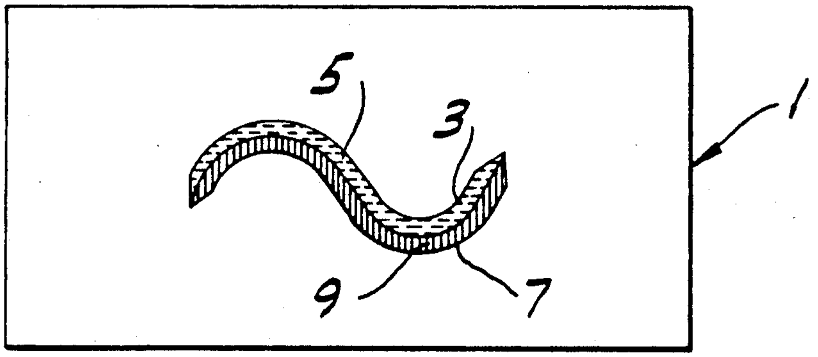
FIG. 5 is a plan view of the panel of FIG. 4 with the second inlay cut out filled with a cured terrazzo blend of a third color.

A second inlay pattern or design 7 is then cut out in panel 1 as previously described and as illustrated in FIG. 4. The panel with silhouette cut-out 7 is then placed in the mold as before and another blend of a suitable binder and aggregate of still a third color is poured into the cut-out 7 as before and cured to produce a panel having a cured inlay of a third color 9 in a cut-out 7 as shown in FIG. 5.

Figure 6:
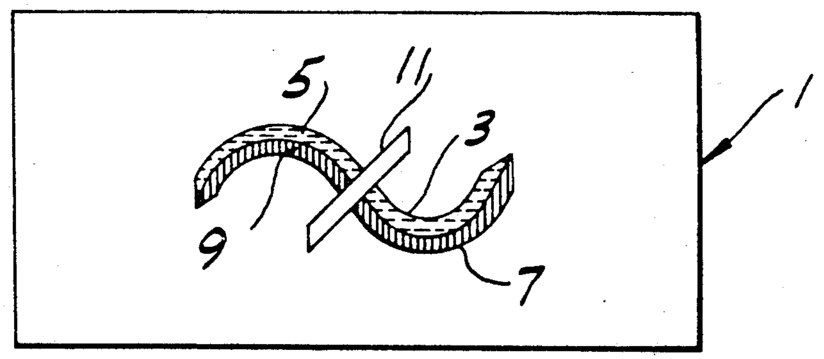
FIG. 6 is a plan view of the panel of FIG. 5 with a third inlay design cut out therein.
Figure 7:
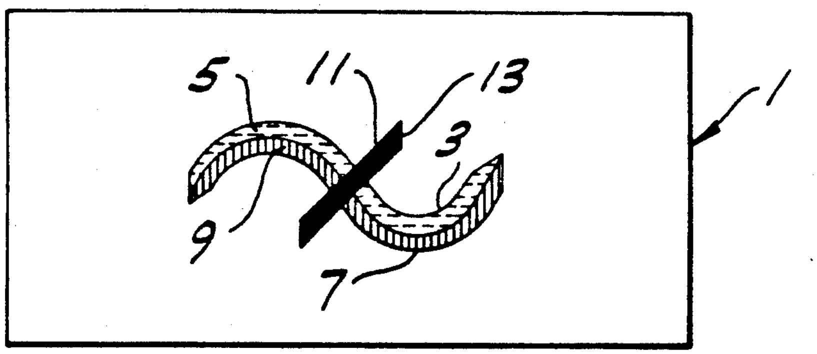
FIG. 7 is a plan view of the panel of FIG. 6 with the third inlay cut out filled with a cured terrazzo blend of a fourth color.

The above procedures may be repeated to produce still a fourth color 13 in cut-out 11 as shown in FIGS. 6 and 7. The resulting panel shown in FIG. 7 has a detailed, multicolor design therein. It will be understood that the process of the invention may be utilized to produce pre-cast terrazzo panels with one, two, three or any desired number of inlay pieces of the same or different colors depending upon the design and effect desired. After all the inlay steps are completed, the panel with the inlay designs therein is thickness gauged and subjected to grinding or grinding and polishing as required. The finished panel may then be cut as necessary into strips, tiles or panels of various dimensions for residential or commercial applications. The panels thus produced may, for example, be standard size panels consisting of straight and corner modules which may be used as components of a modular inlay system in conjunction with standard panels or tiles having no inlay pattern or design and being of the same or different color as the background color of the inlay panels in order to create various designs combining the inlay panels of the invention and non-inlay panels or tiles.

The process of the invention thus permits the practical production of pre-cast terrazzo panels having detailed, multicolor designs therein constituted by background and inlay designs of different colors. Further, the panels produced are distinctive in appearance in that the inlay and background colors are integral with no visible seams or joints and with no divider strips separating the multicolor components of the panels.

In view of the above, it will be seen that the several objects of the invention are achieved and other advantageous results attained.

As various changes could be made in the above process and products without departing from the scope of the invention, it is intended that all matter contained in the above description or shown in the accompanying drawings shall be interpreted as illustrative and not in a limiting sense.

What is claimed is:

1. A pre-cast terrazzo panel having detailed, multicolor designs therein constituted by background and inlay designs of different colors, said inlay design comprising aggregate and binder, said inlay design and panel having two opposite faces, a forming face and a finished face, orientations of said panel and inlay design being such that said aggregate and binder of said inlay design are fully flush with, and settled against, said finished face of said inlay design co-planar with, and forming part of, said finished face of said panel, and wherein said inlay and background designs are integral with no surface difference between said inlay and background designs, said terrazzo panel produced by a process comprising the steps of:
   (a) providing a pre-cast unpolished terrazzo panel with a first background color;
   (b) cutting out an inlay pattern or design in said terrazzo panel, through a complete thickness of said panel, to create a silhouette cut-out panel having a cut-out pattern or design;
   (c) placing said cut-out panel having said cut-out pattern or design in a mold and releasably affixing said finished face of said cut-out panel to a surface of said mold, pouring a blend of a second color comprising said binder and aggregate into said cut-out pattern or design such that said blend contacts said mold surface, vibrating said blend to settle said blend against said mold surface, and curing said blend to create a cured inlay of said second color in said panel, wherein said blend when poured into said cut-out pattern or design is prevented from working its way between said mold surface and said finished face of said cut-out panel due to said finished face of said cut-out panel being releasably affixed to said surface of said mold;
   (d) releasing said panel containing said cured inlay from said mold;
   (e) polishing said finished face of said panel to produce a terrazzo panel having a plurality of different colors therein with said inlay color being integral with said background color and without said different colors being separated from each other by divider strips.

2. A pre-cast terrazzo panel having detailed, multicolor designs therein constituted by background and inlay designs of different colors, said inlay design comprising aggregate and binder in a cut-out pattern or design through a complete thickness of said panel, said inlay design and panel having two opposite faces, a forming face and a finished face, orientations of pg,15 said inlay design and panel being such that said aggregate and binder of said inlay design are fully flush with, and settled against, said finished face of said inlay design co-planar with, and forming part of, said finished face of said panel, and wherein said inlay and background designs are integral with no surface difference between said inlay and background designs and without said different designs being separated from each other by divider strips.

3. The pre-cast terrazzo panel of claim 2 further comprising a second inlay design of a different color from said background and inlay colors, said second inlay design contacting both said inlay design and said background design, and wherein said second inlay, inlay and background designs are integral with no surface difference between said second inlay, inlay and background designs and without said different designs being separated from each other by divider strips.

* * * * *